United States Patent
Chin et al.

(10) Patent No.: US 8,874,111 B2
(45) Date of Patent: Oct. 28, 2014

(54) UPLINK SYNCHRONIZATION OF TD-SCDMA MULTIPLE USIM MOBILE TERMINAL DURING HANDOVER

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 719 days.

(21) Appl. No.: 12/855,511

(22) Filed: Aug. 12, 2010

(65) Prior Publication Data

US 2012/0040672 A1 Feb. 16, 2012

(51) Int. Cl.
*H04W 88/02* (2009.01)
*H04W 56/00* (2009.01)
*H04W 24/10* (2009.01)
*H04W 36/00* (2009.01)

(52) U.S. Cl.
CPC .......... *H04W 56/0005* (2013.01); *H04W 24/10* (2013.01); *H04W 36/00* (2013.01)
USPC ........................................................ 455/436

(58) Field of Classification Search
USPC .......................................... 455/436, 450, 558
See application file for complete search history.

(56) References Cited

U.S. PATENT DOCUMENTS

| | | | | |
|---|---|---|---|---|
| 2003/0125073 A1* | 7/2003 | Tsai et al. | | 455/558 |
| 2005/0099986 A1* | 5/2005 | Grieco et al. | | 370/342 |
| 2007/0133611 A1* | 6/2007 | Li et al. | | 370/503 |
| 2009/0239582 A1 | 9/2009 | Lin | | |
| 2009/0239583 A1* | 9/2009 | Jheng | | 455/558 |
| 2012/0004013 A1* | 1/2012 | Esch et al. | | 455/552.1 |
| 2012/0057525 A1* | 3/2012 | Hou | | 370/328 |
| 2012/0135715 A1* | 5/2012 | Kang et al. | | 455/558 |

FOREIGN PATENT DOCUMENTS

| | | |
|---|---|---|
| CN | 1976514 A | 6/2007 |
| CN | 101133584 A | 2/2008 |
| CN | 101541006 A | 9/2009 |
| EP | 1976170 A1 | 10/2008 |
| WO | WO0036869 A1 | 6/2000 |

OTHER PUBLICATIONS

Erik Dahlmann et al: "3GEvolution: HSPA and LTE for Mobile Broadband, passage", Jun. 1, 2008, 3G Evolution : HSPA and LTE for Mobile Broadband, Academic Press in Elsevier, NL, pp. 490-495, XP002591334, ISBN: 978-0-12-374538-5 paragraph [19.5].
International Search Report and Written Opinion—PCT/US2011/047480—ISA/EPO—Dec. 6, 2011.

* cited by examiner

*Primary Examiner* — Diane Mizrahi
(74) *Attorney, Agent, or Firm* — Kristine U. Ekwueme

(57) ABSTRACT

Certain aspects of the present disclosure provide techniques and apparatus for uplink synchronization of a Time Division-Synchronous Code Division Multiple Access (TD-SCDMA) multiple Universal Subscriber Identity Module (USIM) mobile terminal during a handover. For certain aspects, a method of wireless communication generally includes transmitting, to a Node B, at least one uplink synchronization code from a UE comprising at least a first subscriber identity and a second subscriber identity, receiving timing information for uplink synchronization to the Node B, wherein the timing information is measured based on the at least one uplink synchronization code, and applying the timing information to calls for both of the first and second subscriber identities to synchronize uplink transmissions to the Node B.

12 Claims, 8 Drawing Sheets

| Field | Length | Description |
|---|---|---|
| Signature Reference Number | 3 (MSB) | Indicate SYNC_UL code |
| Relative Sub-Frame Number | 2 | Sub-Frame number preceding the ACK |
| Received starting position of the UpPCH (UpPCHPOS) | 11 | Used for timing correction |
| Transmit Power Level Command for RACH message | 7 | Used for power level in PRACH |
| Reserved bits | 9 (LSB) | N/A |

| Field | Length | Description |
| --- | --- | --- |
| Signature Reference Number | 3 (MSB) | Indicate SYNC_UL code |
| Relative Sub-Frame Number | 2 | Sub-Frame number preceding the ACK |
| Received starting position of the UpPCH (UpPCHPOS) | 11 | Used for timing correction |
| Transmit Power Level Command for RACH message | 7 | Used for power level in PRACH |
| Reserved bits | 9 (LSB) | N/A |

FIG. 4

UPLINK SYNCHRONIZATION OF TD-SCDMA MULTIPLE USIM MOBILE TERMINAL DURING HANDOVER

BACKGROUND

1. Field

Certain aspects of the present disclosure relate generally to wireless communication systems, and more particularly, to techniques for uplink synchronization of a Time Division-Synchronous Code Division Multiple Access (TD-SCDMA) multiple Universal Subscriber Identity Module (USIM) mobile terminal during a handover.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communication is provided. The method generally includes transmitting, to a Node B, at least one uplink synchronization code from a UE comprising at least a first subscriber identity and a second subscriber identity, receiving timing information for uplink synchronization to the Node B, wherein the timing information is measured based on the at least one uplink synchronization code, and applying the timing information to calls for both of the first and second subscriber identities to synchronize uplink transmissions to the Node B.

In an aspect of the disclosure, an apparatus for wireless communication is provided. The apparatus generally includes means for transmitting, to a Node B, at least one uplink synchronization code from a UE comprising at least a first subscriber identity and a second subscriber identity, means for receiving timing information for uplink synchronization to the Node B, wherein the timing information is measured based on the at least one uplink synchronization code, and means for applying the timing information to calls for both of the first and second subscriber identities to synchronize uplink transmissions to the Node B.

In an aspect of the disclosure, an apparatus for wireless communication is provided. The apparatus generally includes at least one processor and a memory coupled to the at least one processor. The at least one processor is typically configured to transmit, to a Node B, at least one uplink synchronization code from a UE comprising at least a first subscriber identity and a second subscriber identity, receive timing information for uplink synchronization to the Node B, wherein the timing information is measured based on the at least one uplink synchronization code, and apply the timing information to calls for both of the first and second subscriber identities to synchronize uplink transmissions to the Node B; and In an aspect of the disclosure, a computer-program product is provided. The computer-program product generally includes a computer-readable medium having code for transmitting, to a Node B, at least one uplink synchronization code from a UE comprising at least a first subscriber identity and a second subscriber identity, receiving timing information for uplink synchronization to the Node B, wherein the timing information is measured based on the at least one uplink synchronization code, and applying the timing information to calls for both of the first and second subscriber identities to synchronize uplink transmissions to the Node B.

BRIEF DESCRIPTION OF THE DRAWINGS

FIG. 4 illustrates the timing information transmitted on a Fast Physical Access Channel (FPACH), in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
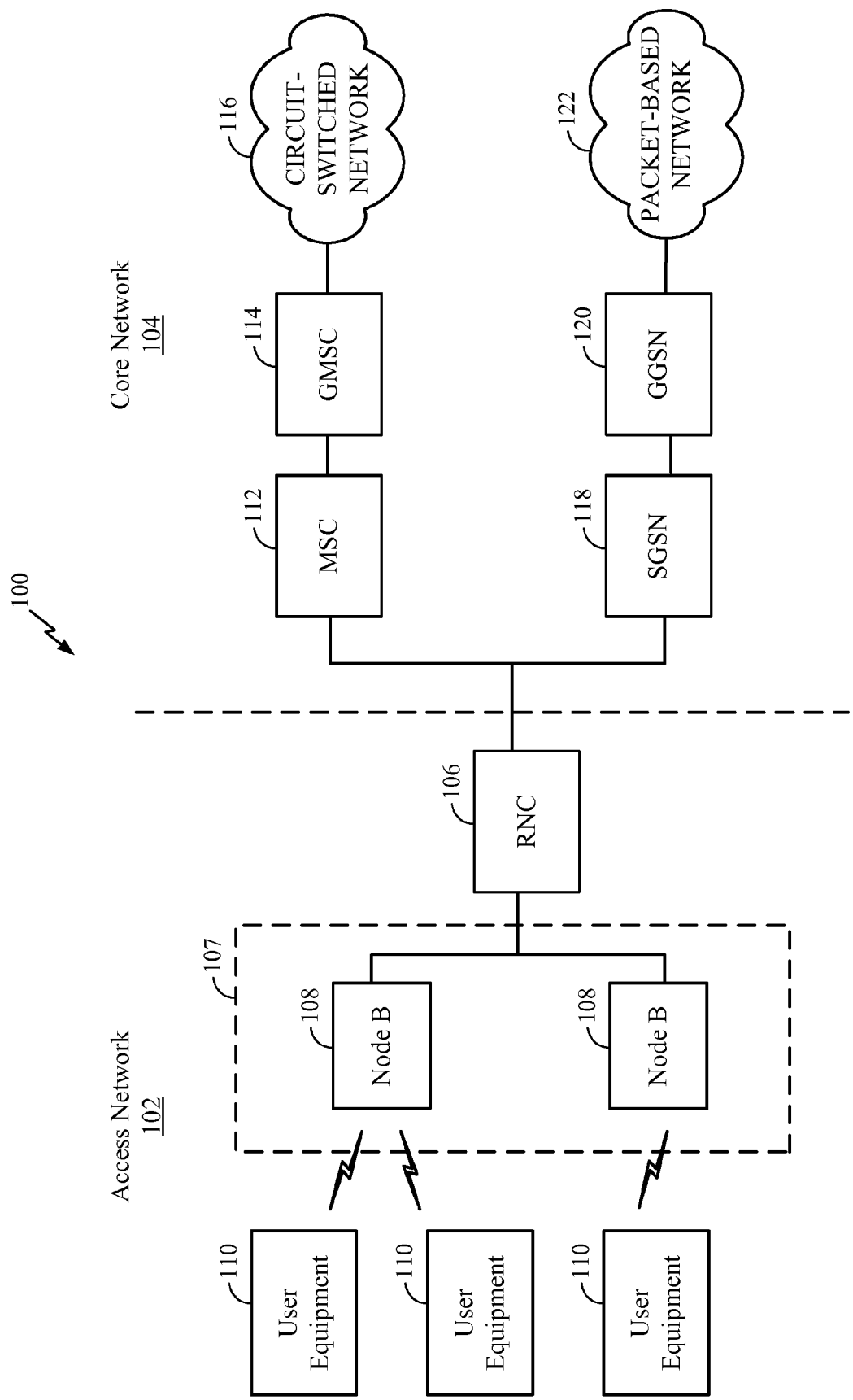
FIG. 1 is a block diagram conceptually illustrating an example of a telecommunications system, in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
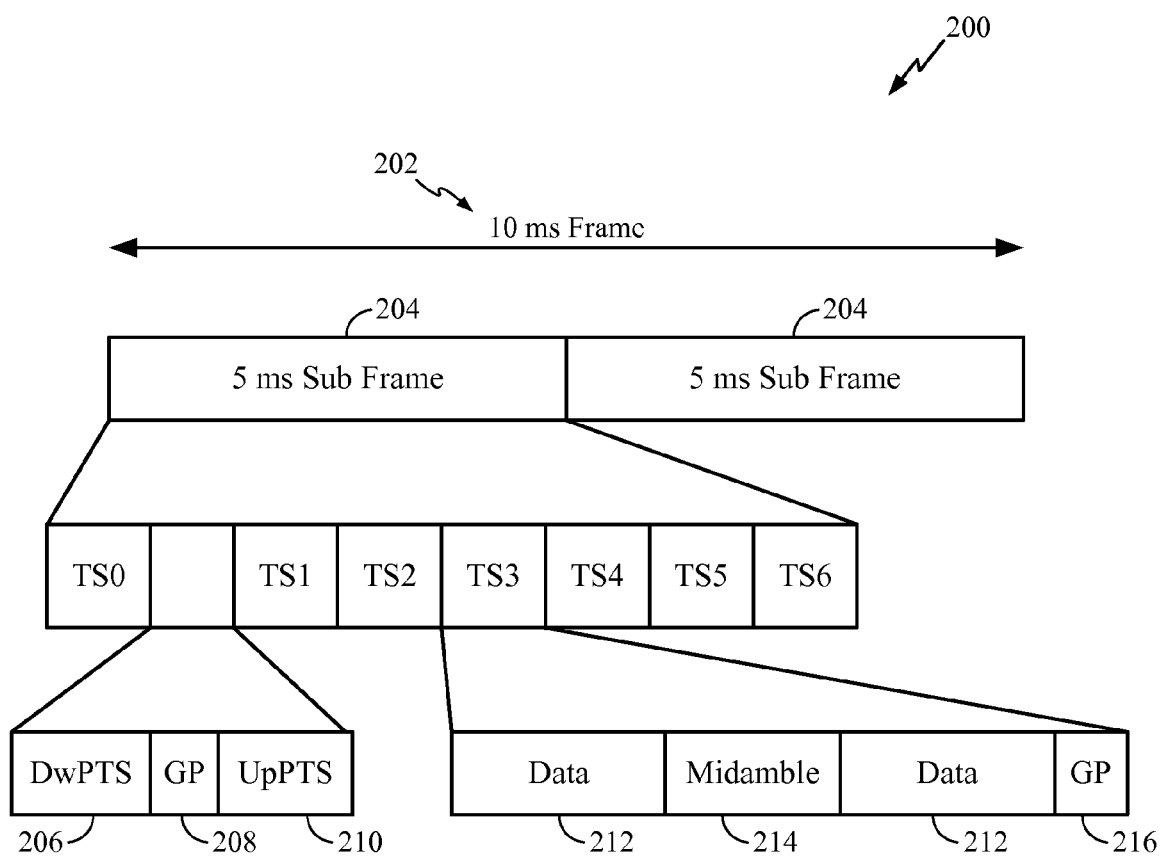
FIG. 2 is a block diagram conceptually illustrating an example of a frame structure in a telecommunications system, in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The seven time slots may be used for regular traffic and signaling. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. DwPTS may be used to transmit DwPCH (Downlink Pilot Channel), which is for transmitting the pilot signal for the cell. The UpPCH may be used for the UE to perform initial random access procedure and UL synchronization in handover.

Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
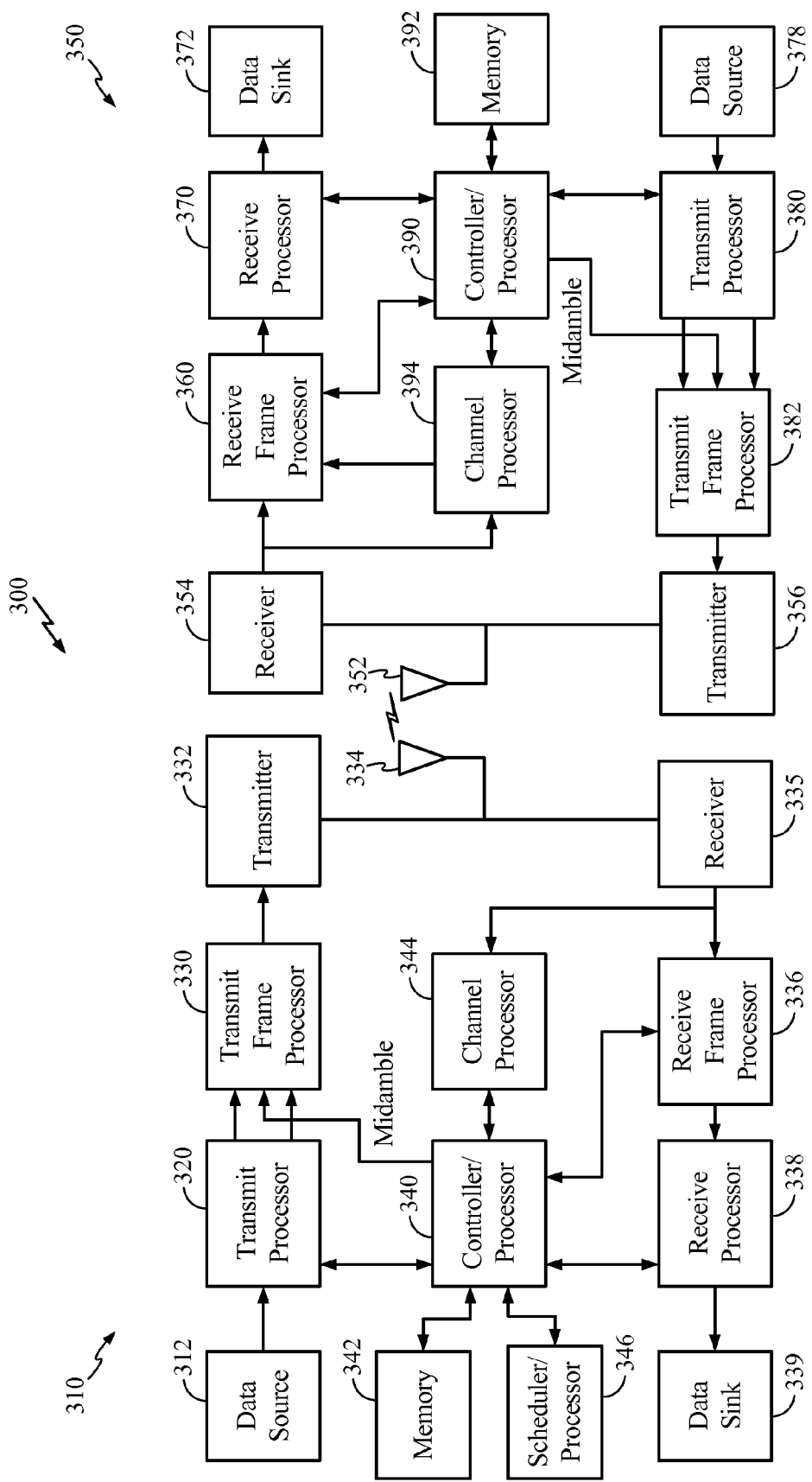
FIG. 3 is a block diagram conceptually illustrating an example of a Node B in communication with a UE in a telecommunications system, in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and de-spreads the symbols, and then determines the most likely signal constellation points transmitted by the Node B 310 based on the modulation scheme. These soft decisions may be based on channel estimates computed by the channel processor 394. The soft decisions are then decoded and de-interleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Uplink Synchronization of TD-SCDMA Multiple
USIM Mobile Terminal During Handover TD-SCDMA (Time Division Synchronous Code Division Multiple Access) is based on time division and code division in order to allow multiple UEs (User Equipments) to share a same radio bandwidth on a particular frequency channel. The downlink and uplink transmissions share the same bandwidth in different time slots (TSs). In each time slot, there are multiple code channels. As discussed in the above paragraphs, in a typical TD-SCDMA frame, one downlink (DL) TS0 is followed by three uplink (UL) TS1~TS3, and followed by three DL TS4~TS6. Between TS0 and TS1, there are Downlink Pilot Time Slot (DwPTS) and Uplink Pilot Time Slot (UpPTS), separated by the gap. DwPTS may be used to transmit DwPCH (Downlink Pilot Channel), and UpPTS may be used to transmit UpPCH (Uplink Pilot Channel).

Mobile phones with multiple USIMs (Universal Subscriber Identity Modules) are fairly popular. For example, a mobile phone may have dual USIMs enabling a user to make/receive phone calls in different numbers. Typically, each USIM has a unique IMSI (International Mobile Subscriber Identity).

The dual USIM phones may be standby dual-USIM phones or active dual-USIM phones. Standby dual-SIM phones allow the phone to switch from one USIM to the other as required but do not allow both USIMs to be active at the same time. Active dual-USIM phones allow both USIMs to be active at the same time.

One important requirement in TD-SCDMA is UL synchronization. In TD-SCDMA systems, different UEs may synchronize on the uplink (UL) such that all transmitted signals may arrive at the Node B (NB) at the same time. The UpPCH (e.g., UpPTS 210) may be defined for this purpose. The UE may transmit an Uplink Synchronization code (SYNC_UL). Then the NB may measure the received timing and send the timing information (e.g., timing correction) using the acknowledgment (ACK) message on the FPACH (Fast Physical Access Channel), as illustrated in FIG. 4.

Figure 5:
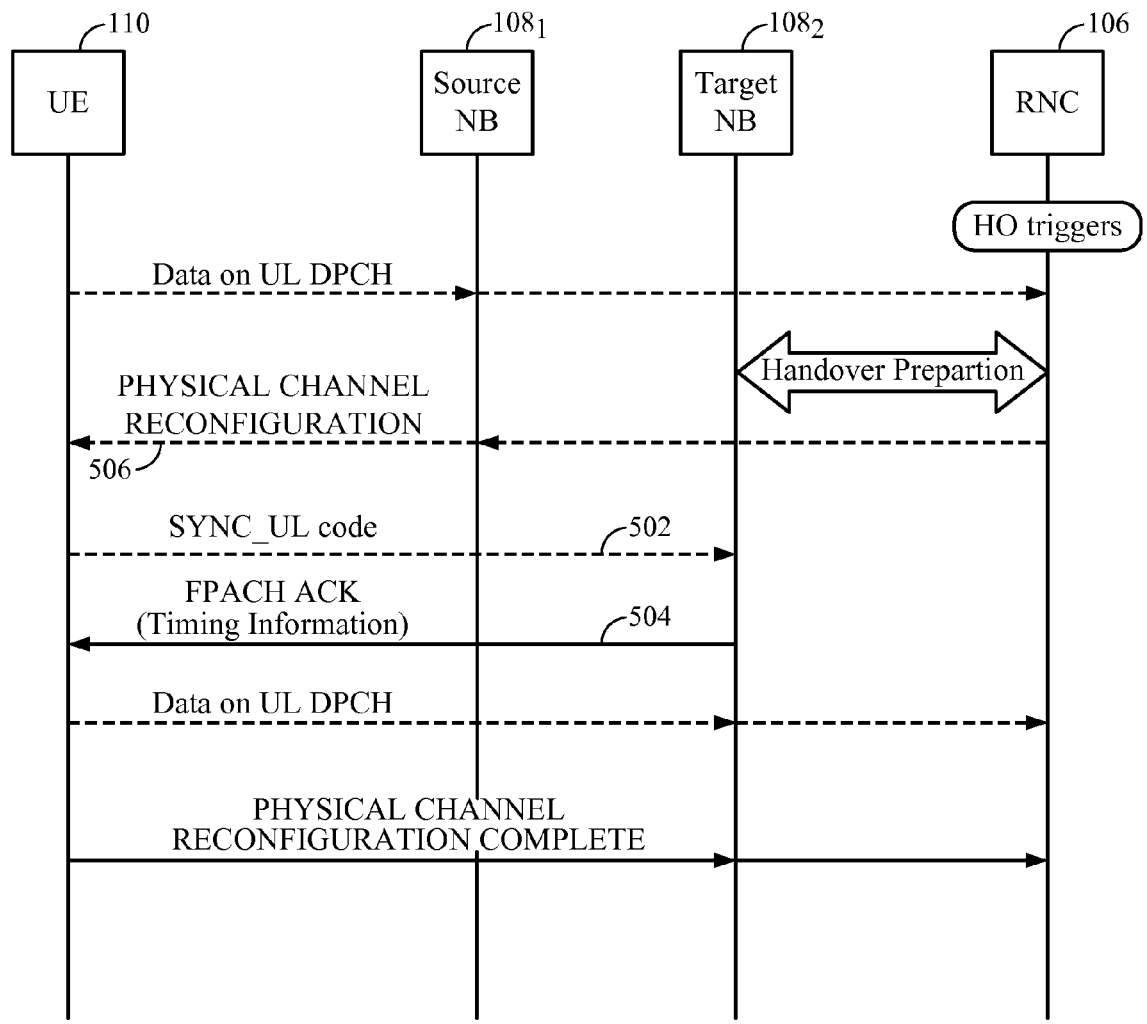
FIG. 5 illustrates the procedure of a TD-SCDMA hard handover.

FIG. 5 illustrates the procedure of a TD-SCDMA hard handover. In the hard handover procedure, the UE 110 may be required to perform a UL synchronization procedure by sending the SYNC_UL code 502 and receiving the FPACH ACK message 504 for the timing correction. Receiving the FPACH ACK message 504 for the timing correction may be a precursor of resuming data transmission at the target NB $108_2$. For some embodiments, the network may send PHYSICAL CHANNEL RECONFIGURATION 506 to indicate the SYNC_UL codes used in UL synchronization at the target NB $108_2$.

A mobile phone may have more than one USIM and therefore the user may make a phone call in different phone numbers. Each USIM may have a unique IMSI (International Mobile Subscriber Identity). For some embodiments, if the multiple USIMs each have a call, then the above TD-SCDMA hard handover procedure may need to be replicated for each of the calls of the multiple USIMs. For example, the UE 110 may need to perform multiple UL synchronization procedures, each for the calls for the multiple USIMs. An enhancement in the UL synchronization procedure in TD-SCDMA for the UE with multiple USIMs may allow for a more efficient handover process, as will be described further herein.

Figure 6:
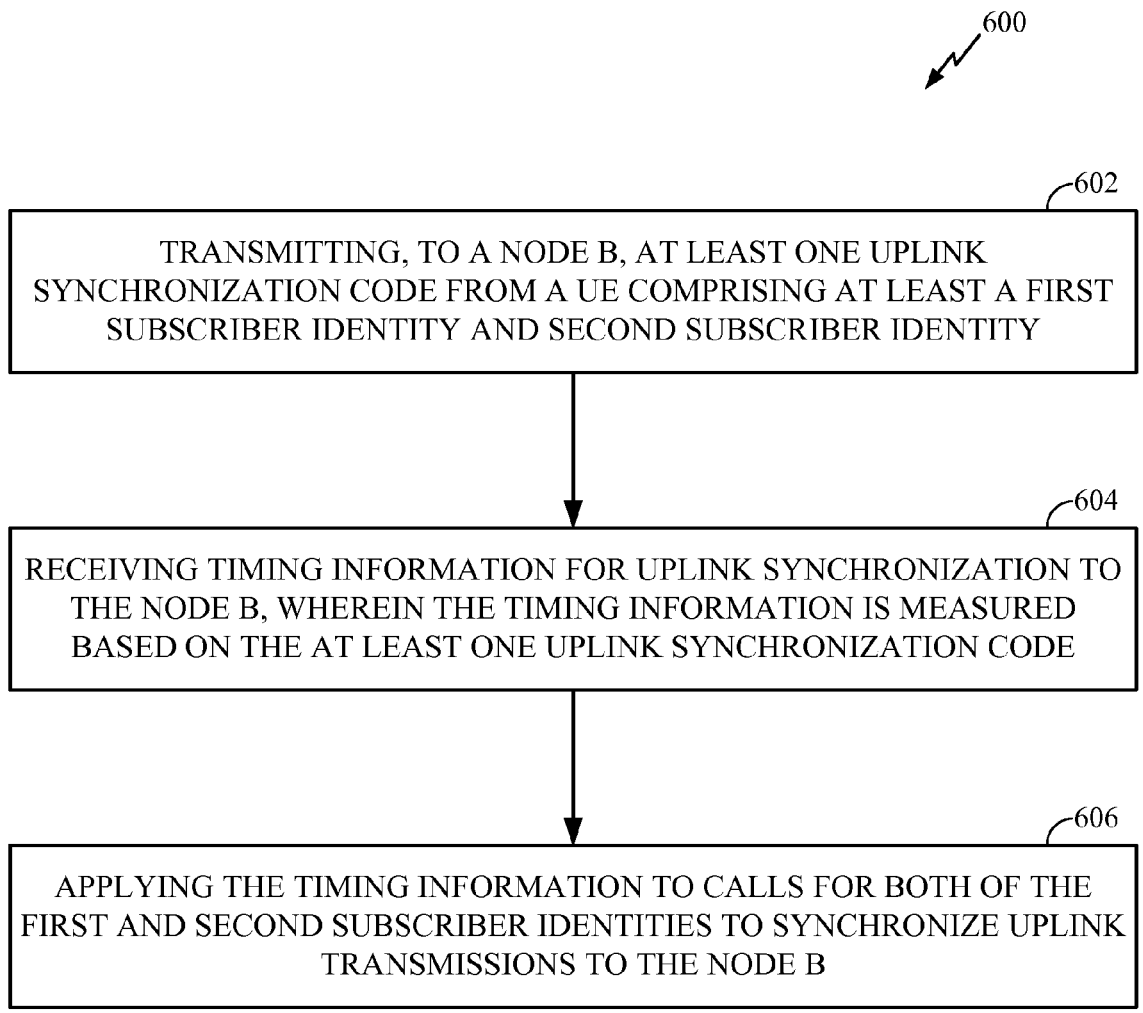
FIG. 6 illustrates example operations for uplink (UL) synchronization in a TD-SCDMA hard handover for a user equipment (UE) with multiple Universal Subscriber Identity Modules (USIMs), in accordance with certain aspects of the present disclosure.

FIG. 6 illustrates example operations 600 that may be performed, for example, by a UE 110, in accordance with certain aspects set for herein. At 602, the UE 110 may transmit, to a Node B (e.g., Node B 108), at least one uplink synchronization code from the UE 110 comprising at least a first subscriber identity and a second subscriber identity. At 604, the UE 110 may receive timing information for uplink synchronization to the Node B 108, wherein the timing information is measured based on the at least one uplink synchronization code. At 606, the UE 110 may apply the timing information to calls for both of the first and second subscriber identities to synchronize uplink transmissions to the Node B 108. UL timing may be the same for all calls since the calls may have the same physical condition as they belong to the same UE 110. In other words, although the calls may belong to different subscriber identities (e.g., different USIMs), UL timing may be the same for all calls.

Figure 7:
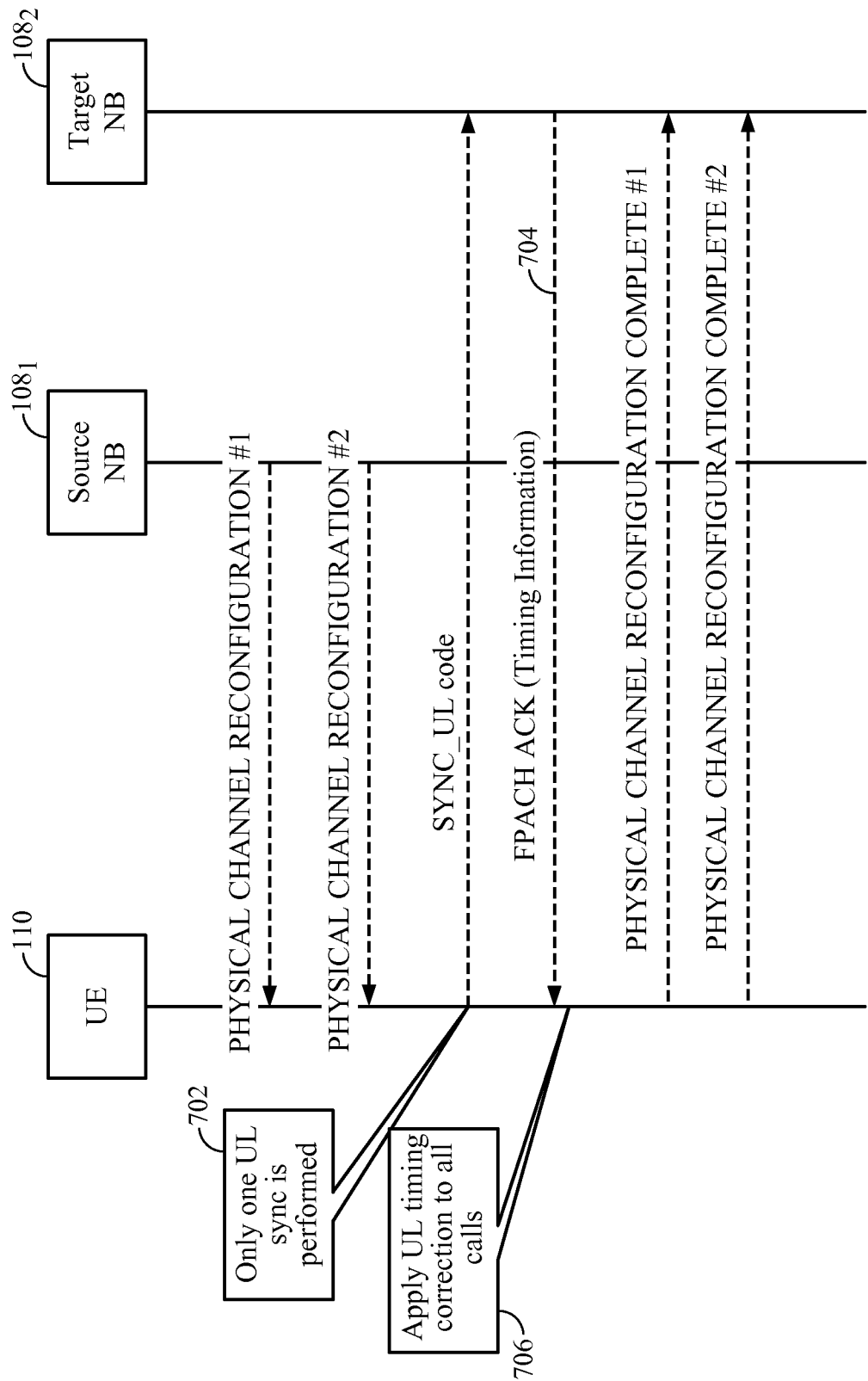
FIG. 7 illustrates a timing diagram wherein a UE, comprising at least a first USIM and a second USIM, may perform one UL synchronization to obtain the timing for all the calls for the multiple USIMs, in accordance with certain aspects of the present disclosure.

FIG. 7 illustrates a timing diagram wherein a UE 110, comprising at least a first USIM and a second USIM, may perform one UL synchronization to obtain the timing for all the calls for the multiple USIMs, in accordance with certain aspects of the present disclosure. This is made possible because UL timing may be the same for all calls although they may belong to different USIMs. As noted at 702, only one UL synchronization may be performed by sending a SYNC_UL code. For example, an UL synchronization may be performed for only the first USIM. At 704, the UE 110 may receive the FPACH ACK message for the timing correction. As noted at 706, the timing correction may be applied to all the calls for the multiple USIMs. In other words, the timing correction may be applied to calls for both of the first and second USIMs, wherein the timing correction may be based on the UL synchronization performed for the first USIM.

Figure 8:
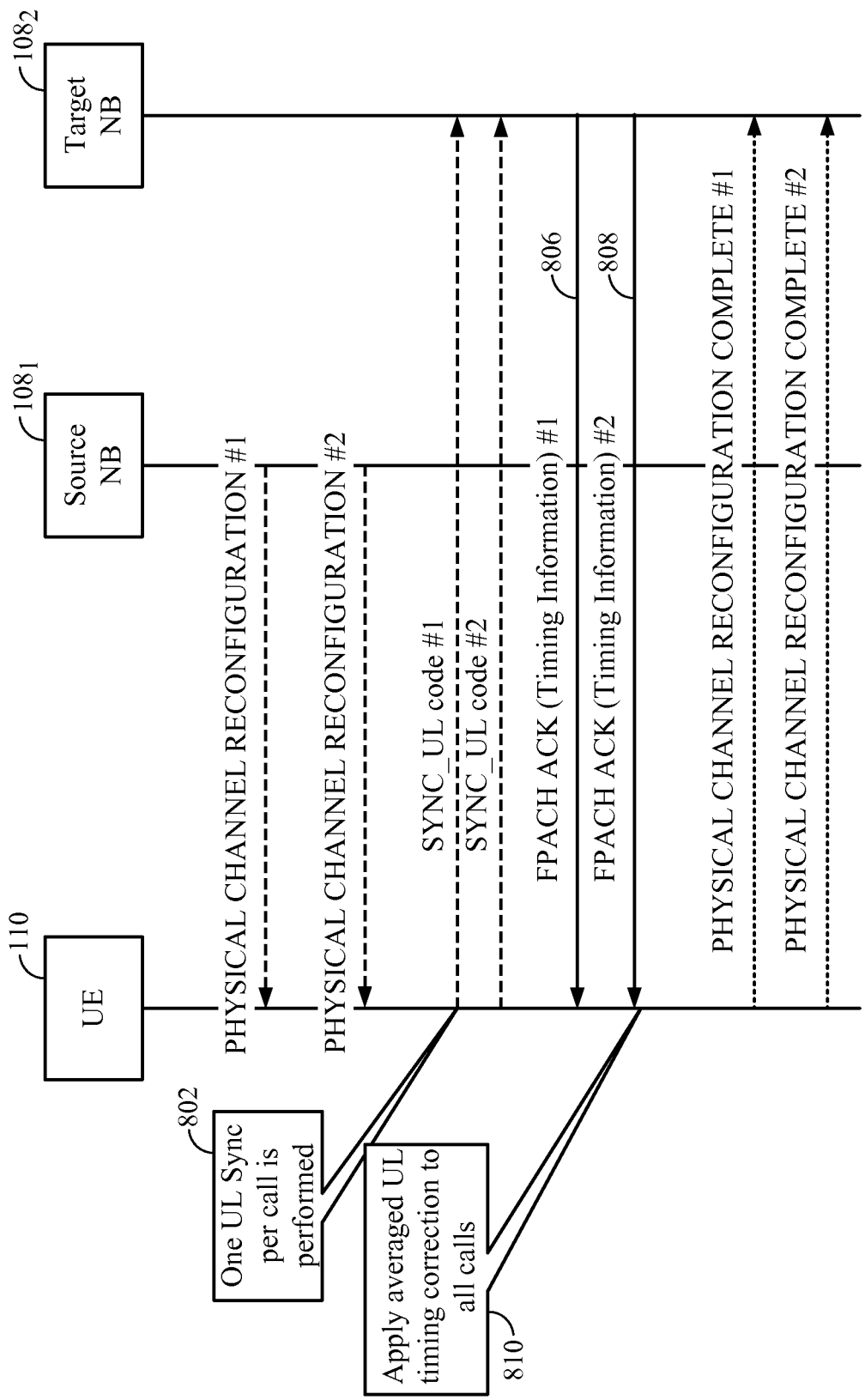
FIG. 8 illustrates a timing diagram wherein a UE, comprising at least a first USIM and a second USIM, may perform multiple UL synchronizations but use an average value to correct the UL timing for all calls, in accordance with certain aspects of the present disclosure.

FIG. 8 illustrates a timing diagram wherein a UE 110, comprising at least a first USIM and a second USIM, may perform multiple UL synchronizations but use an average value to correct the UL timing for all calls, in accordance with certain aspects of the present disclosure. The average value may account for any interference from the data transmissions. As noted at 802, an UL synchronization may be performed for each of the first and second USIMs by sending SYNC_UL code #1 and SYNC_UL code #2, respectively. At 806 and 808, the UE 110 may receive the FPACH ACK messages (i.e., for the timing correction) for each of the first and second USIMs, respectively. However, as noted at 810, an average of the timing corrections received may be applied to calls for both of the first and second USIMs to synchronize uplink transmissions to a target Node B $108_2$.

Embodiments of the present disclosure may allow UL synchronization to be performed more effectively in a multi-USIM TD-SCDMA UE. The UL synchronization may improve reliability or reduce processing.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
transmitting, via a transmitter, to a Node B, at least one uplink synchronization code for at least a time domain system from a user equipment (UE) comprising at least a first subscriber identity and a second subscriber identity;
receiving, via a receiver, timing information for uplink synchronization to the Node B, wherein the timing information is measured based on the at least one uplink synchronization code; and
applying the timing information to calls for both the first and second subscriber identities to synchronize uplink transmissions to the Node B, the timing information, measured based on the uplink synchronization code for the first subscriber identity, being applied to calls for both the first and second subscriber identities to synchronize uplink transmissions to the Node B when only an uplink synchronization code for the first subscriber identity is transmitted to the Node B.

2. The method of claim 1, wherein:
the transmitting comprises transmitting an uplink synchronization code for each of the first and second subscriber identities; and
the applying comprises applying first timing information, measured based on the uplink synchronization code for the first subscriber identity, and second timing information, measured based on the uplink synchronization code for the second subscriber identity.

3. The method of claim 2, wherein:
the applying comprises applying an average of the first and second timing information.

4. An apparatus for wireless communication, comprising:
means for transmitting, to a Node B, at least one uplink synchronization code for at least a time domain system from a user equipment (UE) comprising at least a first subscriber identity and a second subscriber identity;
means for receiving timing information for uplink synchronization to the Node B, wherein the timing information is measured based on the at least one uplink synchronization code; and
means for applying timing information to calls for both the first and second subscriber identities to synchronize uplink transmissions to the Node B, the timing information, measured based on the uplink synchronization code for the first subscriber identity, being applied to calls for both the first and second subscriber identities to synchronize uplink transmissions to the Node B when only an uplink synchronization code for the first subscriber identity is transmitted to the Node B.

5. The apparatus of claim 4, wherein:
the means for transmitting comprises means for transmitting an uplink synchronization code for each of the first and second subscriber identities; and
the means for applying comprises means for applying first timing information, measured based on the uplink synchronization code for the first subscriber identity, and second timing information, measured based on the uplink synchronization code for the second subscriber identity.

6. The apparatus of claim 5, wherein:
the means for applying comprises means for applying an average of the first and second timing information.

7. An apparatus for wireless communication, comprising:
at least one processor adapted to:
 transmit, to a Node B, at least one uplink synchronization code for at least a time domain system from a user equipment (UE) comprising at least a first subscriber identity and a second subscriber identity;
 receive timing information for uplink synchronization to the Node B, wherein the timing information is measured based on the at least one uplink synchronization code; and
 apply timing information to calls for both the first and second subscriber identities to synchronize uplink transmissions to the Node B, the timing information, measured based on the uplink synchronization code for the first subscriber identity, being applied to calls for both the first and second subscriber identities to synchronize uplink transmissions to the Node B when only an uplink synchronization code for the first subscriber identity is transmitted to the Node B.

8. The apparatus of claim 7, wherein:
the at least one process adapted to transmit comprises transmitting an uplink synchronization code for each of the first and second subscriber identities; and
the at least one process adapted to apply comprises applying first timing information, measured based on the uplink synchronization code for the first subscriber identity, and second timing information, measured based on the uplink synchronization code for the second subscriber identity.

9. The apparatus of claim 8, wherein:
the at least one process adapted to apply comprises applying an average of the first and second timing information.

10. A computer-program product, comprising:
a non-transitory computer-readable medium for a user equipment (UE) having program code recorded thereon, the program code comprising:
 program code to transmit, to a Node B, at least one uplink synchronization code for at least a time domain system from a user equipment (UE) comprising at least a first subscriber identity and a second subscriber identity;
 program code to receive timing information for uplink synchronization to the Node B, wherein the timing information is measured based on the at least one uplink synchronization code; and
 program code to apply timing information to calls for both the first and second subscriber identities to synchronize uplink transmissions to the Node B, the timing information, measured based on the uplink synchronization code for the first subscriber identity, being applied to calls for both the first and second subscriber identities to synchronize uplink transmissions to the Node B when only an uplink synchronization code for the first subscriber identity is transmitted to the Node B.

11. The computer-program product of claim 10, wherein the program code further comprises:
 program code to transmit an uplink synchronization code for each of the first and second subscriber identities; and
 program code to apply first timing information, measured based on the uplink synchronization code for the first subscriber identity, and second timing information, measured based on the uplink synchronization code for the second subscriber identity.

12. The computer-program product of claim 11, wherein the program code further comprises:
 program code to apply an average of the first and second timing information.

* * * * *